United States Patent
Umemura et al.

(10) Patent No.: US 7,725,650 B2
(45) Date of Patent: May 25, 2010

(54) STORAGE SYSTEM AND METHOD FOR CONTROLLING THE SAME

(75) Inventors: Shoko Umemura, Tokyo (JP); Eiichi Sato, Hiratsuka (JP)

(73) Assignee: Hitachi, Ltd., Tokyo (JP)

( * ) Notice: Subject to any disclaimer, the term of this patent is extended or adjusted under 35 U.S.C. 154(b) by 100 days.

(21) Appl. No.: 11/471,714

(22) Filed: Jun. 21, 2006

(65) Prior Publication Data
US 2007/0250679 A1 Oct. 25, 2007

(30) Foreign Application Priority Data
Apr. 21, 2006 (JP) ............................ 2006-118255

(51) Int. Cl.
*G06F 12/00* (2006.01)
(52) U.S. Cl. ...................... 711/112; 711/170
(58) Field of Classification Search ................ 711/170
See application file for complete search history.

(56) References Cited

U.S. PATENT DOCUMENTS 5,684,974 A * 11/1997 Onodera ..................... 711/202
6,725,328 B2 * 4/2004 Kano et al. ................. 711/112
6,892,275 B2 * 5/2005 Bolt et al. ................... 711/114
2005/0108292 A1 * 5/2005 Burton et al. ............... 707/200
2005/0188252 A1 * 8/2005 Amano ......................... 714/6
2006/0179209 A1 * 8/2006 Wang et al. ................. 711/101

FOREIGN PATENT DOCUMENTS

| JP | 2003-015915 | 1/2003 |
|---|---|---|
| JP | 2005-004349 | 1/2005 |

* cited by examiner

*Primary Examiner*—Matt Kim
*Assistant Examiner*—Ryan Dare
(74) *Attorney, Agent, or Firm*—Antonelli, Terry, Stout & Kraus, LLP.

(57) ABSTRACT

A storage system where storage areas are provided to host systems using a conventional AOU technique, the storage system being able to reduce power consumption by the storage resources allocated to pools and prevent the shortening of the life expectancy of the storage resources. In the storage system, data storage devices defined as belonging to the pools are allocated to virtual volumes. Allocation is performed in accordance with access by the hosts. The data storage devices are powered off before being allocated to the virtual volumes and powered on after being allocated.

10 Claims, 15 Drawing Sheets

FIG.5

| # | TYPE | PERFORMANCE (DISK TYPE) | REMAINING CAPACITY | STORAGE APPARATUS | ACCESS FREQUENCY | AOU ALLOCATION | POWER |
|---|------|---|---|---|---|---|---|
| 1 | FC | 146GB-15000rpm | 300MB | DF700 #1 | HIGH | ON | ON |
| 2 | FC | 73GB-15000rpm | 2500MB | DF700 #2 | MEDIUM | ON | ON |
| 3 | FC | 146GB-10000rpm | 1500MB | DF600 #1 | LOW | ON | ON |
| 4 | FC | 73GB-10000rpm | 1700MB | DF600 #1 | HIGH | OFF | ON |
| 5 | SATA | 250GB-7200rpm | 3200MB | DF700 #3 | HIGH | OFF | ON |
| 6 | SATA | 400GB-7200rpm | 1000MB | DF700 #3 | MEDIUM | OFF | OFF |
| 7 | SATA | 250GB-7200rpm | 900MB | DF700 #4 | LOW | OFF | OFF |
| 8 | SATA | 250GB-7200rpm | 1500MB | DF600 #2 | MEDIUM | OFF | OFF |
| 9 | SATA | 400GB-7200rpm | 2100MB | DF600 #2 | LOW | OFF | OFF |

| POOL NAME | TOTAL CAPACITY | NON-AOU-ALLOCATED AREA | NON-ALLOCATED, POWERED-ON AREA | PERCENTAGE OF CURRENTLY POWERED-ON HDDS | THRESHOLD VALUE FOR POWERED-ON HDDS | PERCENTAGE OF TO-BE-POWERED-ON HDDS |
|---|---|---|---|---|---|---|
| POOL A | 100000MB | 25000MB | 7500MB | 30% | 10% | 20% |
| POOL B | 60000MB | 6000MB | 3000MB | 50% | - | - |

FIG.9
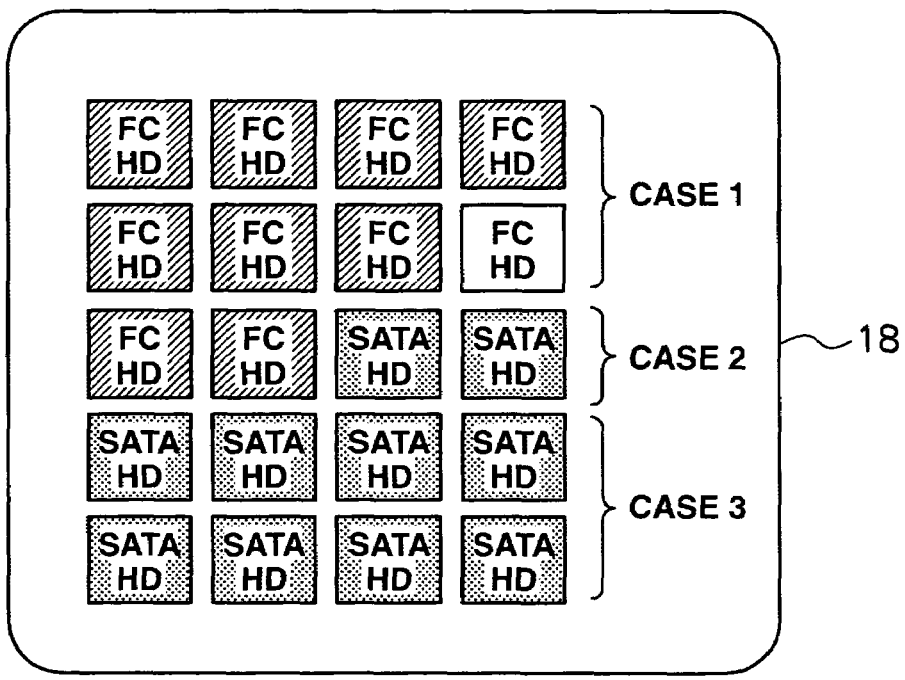
 :POWERED-ON (NON-AOU-ALLOCATED)
 POWERED-ON (AOU-ALLOCATED)
 :POWERED-OFF (NON-AOU-ALLOCATED)

FIG.15
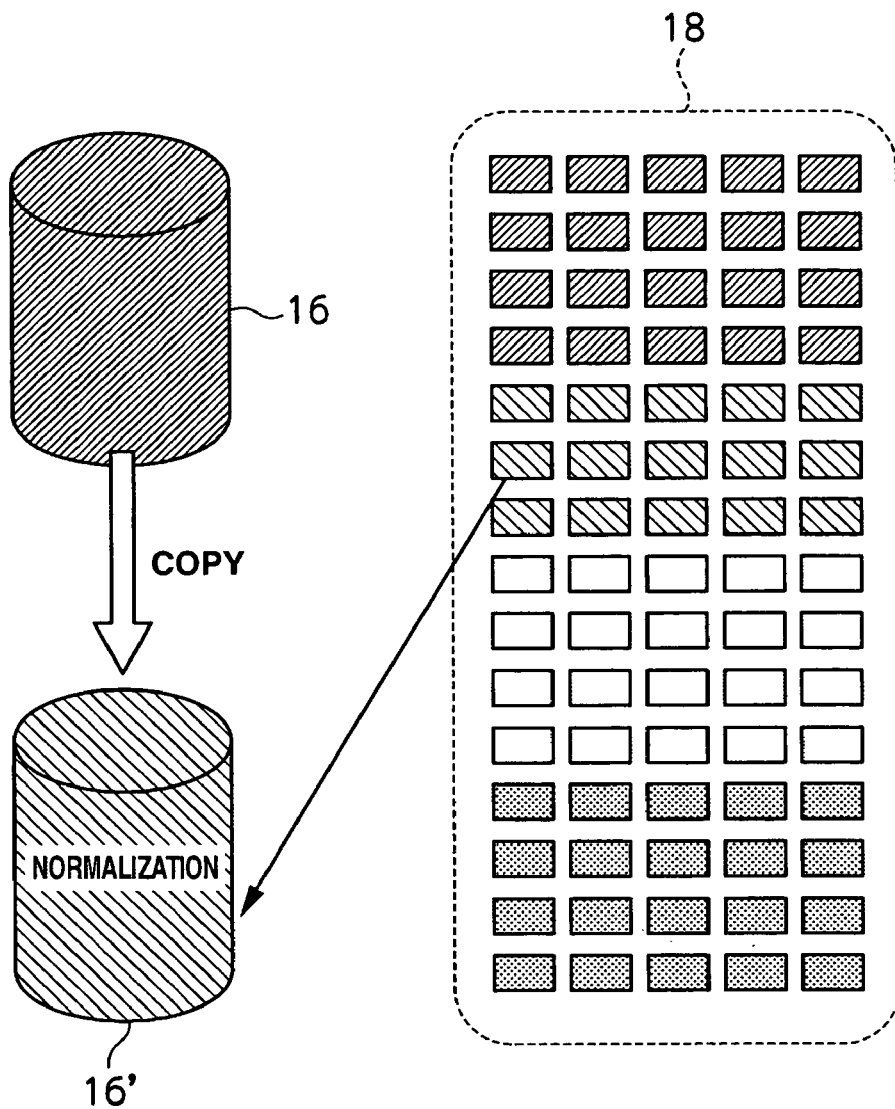
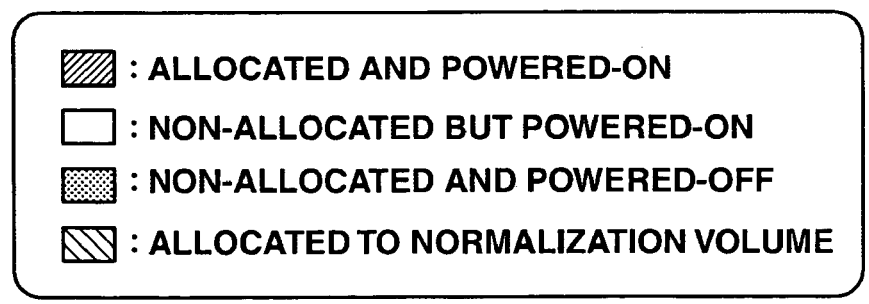

FIG.16

| # | TYPE | PERFORMANCE (DISK TYPE) | REMAINING CAPACITY | STORAGE APPARATUS | ACCESS FREQUENCY | DISK ATTRIBUTE | AOU ALLOCATION | POWER |
|---|------|------------------------|--------------------|--------------------|------------------|----------------|----------------|-------|
| 1 | FC | 146GB-15000rpm | 300MB | DF700 #1 | HIGH | AOU | ON | ON |
| 2 | FC | 146GB-10000rpm | 1500MB | DF700 #2 | MEDIUM | Fixed | - | ON |
| 3 | FC | 146GB-10000rpm | 2100MB | DF700 #2 | LOW | AOU | OFF | OFF |

STORAGE SYSTEM AND METHOD FOR CONTROLLING THE SAME

CROSS REFERENCES TO RELATED APPLICATIONS

This application relates to and claims priority from Japanese Patent Application No. 2006-118255, filed on Apr. 21, 2006 the entire disclosure of which is incorporated herein by reference.

BACKGROUND

The present invention relates to a storage system that controls data-in data storage devices such as hard disk drives (hereinafter called 'HDDs'), and also to a method for controlling the storage system. This invention particularly relates to power supply control for the data storage devices.

With the increase in the amount of data dealt with in computer systems each having a storage system and host system(s), such as server(s) or host computer(s) connected to the storage system via a communication path such as a network, the capacity of the storage areas in the storage systems has also expanded. In these storage systems, logical volumes accessible by the host systems are defined so that the host systems access physical storage areas allocated to the logical volumes, thereby enabling the input/output of data to/from the data storage devices.

Recently, because the amount of data dealt with in host systems has increased dramatically, the size of volumes, i.e., the storage capacity of the volumes, also has had to be increased to a large extent. If the host systems are each provided with large-size storage areas from the beginning, they will not have a shortage of storage capacity and it will be unnecessary to expand the size of the storage areas at a later point in time. However, if the host systems—computers—do not use a large amount of data, some of the storage areas allocated to the host systems remain unused and because the storage areas are fixed to the host systems, these unused storage areas are wasted.

In light of this, Japanese Patent Laid-Open (Kokai) Publication No. 2003-15915 proposes, for the purpose of expanding the storage capacity of logical volumes by dynamically allocating storage areas having appropriate capacities from among collectively-managed storage areas to the logical volumes during operation of host systems, a storage system that monitors logical block addresses for read or write I/O from the host systems to logical volumes in data storage devices; dynamically expands the storage areas of the logical volumes based on the logical block addresses; and also expands the storage area of a logical volume when an instruction unit in the host systems commands a volume server to expand the capacity of the logical volume.

Incidentally, Japanese Patent Laid-Open (Kokai) Publication No. 2005-4349—prior art related to this invention—aims to provide a mechanism where, when a storage apparatus (storage system). lacks storage areas, storage resources of another storage apparatus are effectively used without adding physical disks to the lacking storage areas, and discloses a computer system. where a first storage apparatus judges whether it can write data in a first storage area when it receives a data write request from an information processor; and when the judgment is negative, the first storage apparatus requests information for judging whether it can secure a second storage area for storing the data from a second storage apparatus; and where, in response to this request, the second storage apparatus sends the information regarding whether the second storage area can be secured for the first storage apparatus to the first storage apparatus; the first storage apparatus judges whether it can secure the second storage area based on the information; and if the judgment is positive, the first storage apparatus sends the data to the second storage apparatus so that it will be stored in the second storage area.

SUMMARY

The applicant has developed a technique—'Allocation on Use (AOU)'—in order to effectively use storage resources in a storage system. With the AOU technique, a storage system provides virtual volumes having no storage areas to a host system and these virtual volumes are associated with sets of data storage devices called 'pools.' When a host system accesses one of the virtual volumes, the storage system allocates the storage areas in the data storage devices belonging to the corresponding pool to the virtual volume. This allocation is performed each time the host system accesses a virtual volume. Because a single pool can be associated with a plurality of virtual volumes, the storage system can use the storage areas of the pool effectively. The storage system has virtual volumes with virtual, large capacities in advance and a new data storage device is added to a pool in accordance with the usage of the existing data storage devices in the pool.

The AOU technique, however, has a problem in that, if the data storage devices—HDDs—belonging to the pools are continuously powered on even before the start of allocation until the end of the allocation to the virtual volumes, considerable power is consumed and the life of the HDDs is shortened. Thereupon, this invention aims to provide a storage system, where storage areas are provided to a host system using the foregoing AOU technique, (the storage system) being able to reduce the power required by the storage resources allocated to pools and prevent the shortening of the life expectancy of the storage resources. This invention also aims to provide a storage system being able to increase the speed for host systems accessing the storage resources.

In order to achieve the foregoing objectives, this invention provides a low-power storage system where data storage devices that are not allocated to virtual volumes are put in standby mode, and when the data storage devices are allocated to the virtual volumes, they are put in operational mode from the standby mode. The data storage devices are put in operational mode preferably before allocation. More specifically, the data storage devices are put in operational mode from standby mode preferably starting with those having higher allocation priority. Also, preferably, a certain percentage of non-allocated data storage devices may be put in operational mode from standby mode. The standby mode in the data storage devices is a situation where the driving circuits of the data storage devices are powered off, or the situation where the data storage devices are powered on, but in power-saving mode.

As explained above, according to this invention, in a storage system where storage areas are provided to a host system using the AOU technique, the power consumption by storage resources allocated to pools can be reduced and the shortening of the life expectancy of the storage resources can be prevented. Moreover, according to this invention, the speed for host systems accessing the storage resources can be increased.

BRIEF DESCRIPTION OF THE DRAWINGS

FIG. 5 is a management table for a controller to control the data storage devices;

FIG. 9 is a block diagram of a pool, showing that the data storage devices are powered on/off by cases;

FIG. 15 is a block diagram showing the function of migrating data stored in a data storage device in a pool to a normalization volume; and FIG. 16 is a disk management table for normalization processing.

DETAILED DESCRIPTION OF THE PREFERRED EMBODIMENTS

Figure 1:
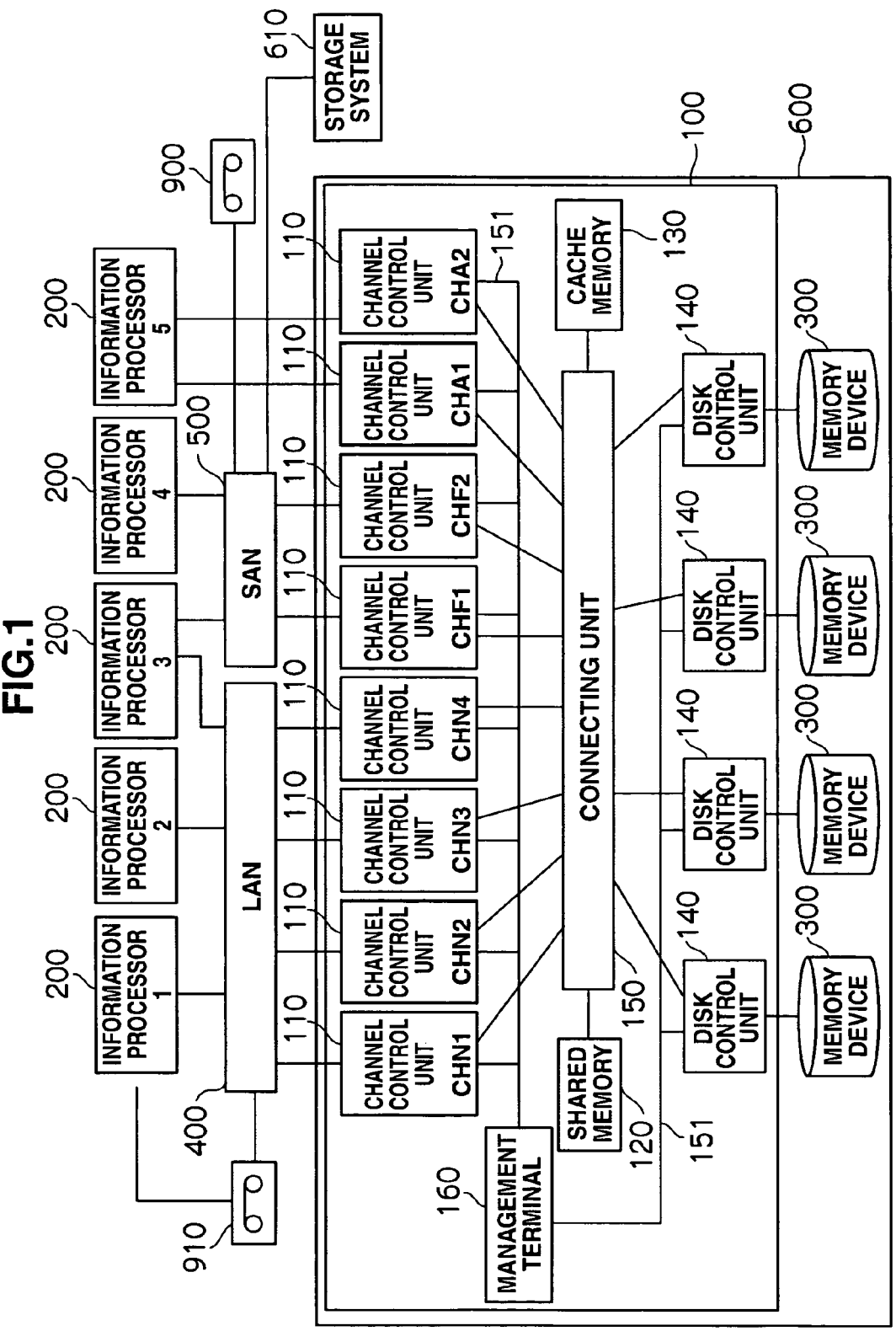
FIG. 1 is a hardware block diagram of a storage control system including a storage system where this invention is applied.

An embodiment of this invention is described below in detail with reference to the attached drawings. Incidentally, in the diagrams explained below, the same parts are given the same reference numerals and explanations for those same parts will not be repeated, or will be simplified. FIG. 1 is a hardware block diagram showing a storage control system including a storage system (sometimes called 'storage apparatus') 600 in which this invention is applied. The storage system 600 has a plurality of data storage devices 300, and a storage device controller 100 that controls the input/output of data to/from the data storage devices 300 performed in response to input/output requests from information processors 200.

The information processors 200—host systems—are servers or host computers (hosts) having CPUs and memory, or management computers managing the storage system. More specifically, they are work stations, mainframe computers, or personal computers. The information processors 200 may also be computers connected to each other via a network. The information processors 200 have an application program operating on an operating system. Examples of the application program include ATM programs used at banks, and airline seat reservation programs. Examples of the servers include update-type servers that run applications; and backup servers that back up data at the back end of the update-type servers.

The information processors 1 to 3 (200) are connected via a LAN (Local Area Network) 400, to the storage system 600. The LAN 400 is, for example, a communication network such as an Ethernet (registered trademark) or FDDI, and the communication between the information processors 1 to 3 (200) and the storage system 600 is performed according to TCP/IP protocol. The information processors 1 to 3 (200) send file name-designated data access requests (requests for inputting/outputting data in units of files, hereinafter called 'file-access requests') to the channel control units CHN1 to CHN4 (110), which will be described later, in the storage system 600.

The LAN 400 is connected to a backup device 910. This backup device 910 is, for example, a disk-type device such as a MO, CD-R or DVD-RAM; or a tape-type device such as a DAT tape, cassette tape, open tape, or cartridge tape. The backup device 910 stores a backup of the data stored in the data storage devices 300 by communicating with the storage device controller 100 via the LAN 400. It is also connected to the information processor 1 (200) so that it can obtain a backup of the data stored in the data storage devices 300 also via the information processor 1 (200).

The storage device controller 100 has channel control units CHN1 to CHN4 (110). The storage device controller 100 passes write/read accesses from the information processors 1 to 3 (200) to the backup device 910 and data storage devices 300 by means of the channel control units CHN1 to CHN 4 (110) and the LAN 400. The channel control units CHN1 to CHN 4 (110) each receive file-access requests from the information processors 1 to 3 (200). More specifically, each channel control unit (CHN1 to CHN4) (110) is assigned a unique network address on the LAN 400 (e.g., IP address), serves as a NAS, and provides NAS services to the information processors 1 to 3 (200) as if it is an independent NAS. According to this invention, conventional NAS servers operating separately in different, independent computers are collected in one storage system 600 by having the storage system 600 include the channel control units CHN1 to CHN4 (110) that provide NAS services. This enables collective management of the storage system 600 as well as efficient maintenance operations such as various settings, various kinds of control, failure management, and version management.

The information processors 3 and 4 (200) are connected to the storage device controller 100 via a SAN 500. The SAN 500 is a network for transmitting/receiving data to/from the information processors 3 and 4 (200) in units of blocks, which are data management units in the storage areas provided by the data storage devices 300. Communication between the information processors 3 and 4 (200) and the storage device controller 100 via the SAN 500 is performed usually according to SCSI protocol. The information processors 3 and 4 (200) send requests to access data in units of blocks (hereinafter called 'block-access requests) to the storage system 600 according to Fibre Channel Protocol.

The SAN 500 is connected to a SAN-compatible backup device 900. This SAN-compatible backup device 900 stores a backup of the data stored in the data storage devices 300 by communicating with the storage device controller 100 via the SAN 500.

In addition to the channel control units CHN1 to CHN4 (110), the storage device controller 100 also has channel control units CHF1 and CHF2 as well as CHA1 and CHA2 (110). The storage device controller 100 communicates with the information processors 3 and 4 (200) and the SAN-compatible backup device 900 via the channel control units CHF1 and CHF2 (110) and the SAN 500. The channel control units process access commands from the host systems.

The information processor 5 (200) is connected to storage device controller 100 without involving any network such as the LAN 400 or SAN 500. This information processor 5 (200)

is, for example, a mainframe computer. Communication between the information processor 5 (200) and the storage device controller 100 is performed according to communication protocols such as FICON (Fiber Connection; registered trademark), ESCON (Enterprise System Connection; registered trademark), ACONARC (Advanced Connection Architecture; registered trademark), and FIBARC (Fiber Connection Architecture; registered trademark). The information processor 5 (200) sends block-access requests to the storage system 600 according to these communication protocols. The storage device controller 100 communicates with the information processor 5 (200) via the channel control units CHA 1 and CHA2 (110).

The SAN 500 is connected to another storage system 610. The storage system 610 has a function that provides its storage resources to the storage system 600. In other words, the storage apparatus 610 expands the storage areas virtually provided to the information processors by the storage apparatus. Incidentally, the storage system 610 may also be connected to the storage system 600 via, in addition to the SAN 500, a communication circuit such as an ATM. Alternatively, the storage system 610 may be directly connected to the storage system 600.

As described above, because the storage system 600 includes the channel control units CHN1 to CHN4 (110), CHF1 and CHF 2 (110), and CHA1 and CHA2, it can be connected to different kinds of networks. In other words, the storage system 600 is a SAN-NAS integration storage system, being connected to the LAN 400 using the channel control units CHN1 to CHN4 (110) and also to the SAN 500 using the channel control units CHF1 and CHF2.

The connecting unit 150 connects the respective channel control units 110, shared memory 120, cache memory 130, and respective disk control units 140 to one another. The data storage devices are mainly hard disk drives, and so units for controlling the data storage devices are called disk control units. Transmission of commands and data between these channel control units 110, shared memory 120, cache memory 130, and disk control units 140 is performed via the connecting unit 150. The connecting unit 150 is a high-speed bus such as an ultrahigh-speed crossbar switch that transmits data by high-speed switching. The connecting unit 150 enhances communication performance between the channel control units 110 and enables a high-speed file sharing function and high-speed failover.

The shared memory 120 and cache memory 130 are data storage devices shared by the channel control units 110 and disk control units 140. The shared memory 120 is mainly used for storing control information and commands and the cache memory 130 is mainly used for storing data. For example, when a channel control unit 110 receives a data input/output command from an information processor 200 and that command is a write command, it writes the write command in the shared memory 120 and writes write data received from the information processor 200 in the cache memory 130. The disk control units 140 monitor the shared memory 120, and when they detect that a write command has been written in the shared memory 120, the relevant disk control unit 140 reads the write data from the cache memory 130 according to the write command and writes it in the data storage devices 300.

Meanwhile, when a channel control unit 110 receives a data input/output command from an information processor 200 and that command is a read command, it writes the read command in the shared memory 120 and checks whether the read target data exists in the cache memory 130. If the read target data exists in the cache memory 130, the channel control unit 110 reads it from the cache memory 130 and sends it to the information processor 200. If the read target data does not exist in the cache memory 130, the relevant disk control unit 140, which has detected that the read command has been written in the shared memory 120, reads the read target data from the data storage devices 300, writes it in the cache memory 130, and writes that fact in the shared memory 120. The channel control units 110 monitor the shared memory 120 and when they detect that the read target data has been written in the cache memory 130, the relevant channel control unit 110 reads the data from the cache memory 130 and sends it to the information processor 200.

The disk control units 140 convert logical address-designated data access requests, which are sent from the channel control units 110 to request access to the data storage devices 300, to physical address-designated data access requests; and write/read data in/from the data storage devices 300 in response to I/O requests sent from the channel control units 110. If the data storage devices 300 are configured according to RAID, the disk control units 140 access data according to the RAID configuration. The disk control units 140 also perform restore management for the data stored in the data storage devices 300, backup control, and replication control or remote copy control for preventing data loss in the event of disaster (disaster recovery). In other words, the disk control units 140 control the HDDs—data storage devices—as well as RAID groups composed of storage areas of a plurality of HDDs.

Each data storage device 300 has one or more disk drives (physical volumes) and provides storage areas the information processors 200 can access. For these storage areas provided by the data storage device 300, logical volumes consisting of one or more physical volumes are set. Examples of the logical volumes set for the data storage devices 300 include user logical volumes the information processors 200 can access; and system logical volumes used for controlling the channel control units 110. These system logical volumes store an operating system run by the channel control units 110. Also, the logical volumes the data storage devices 300 provide to the information processors can be accessed by the respective channel control units 110. A single logical volume can be shared by multiple channel control units 110.

Incidentally, examples of the data storage devices 300 include HDDs. and semiconductor memory (e.g., flash memory). Regarding the structure of the data storage devices 300, RAID-type disk arrays may be structured from the multiple data storage devices 300. The data storage devices 300 and the data storage device controller 100 may be directly connected or may be connected via a network. Also, the data storage devices 300 and the data storage device controller 100 may be integrated as one.

A management terminal 160 is a computer for maintaining and managing the storage system 600 and is connected to the respective channel control units 110 and disk control units 140 via an internal LAN 151. An operator of the management terminal 160 can make disk drive settings for the data storage device 300, logical volume settings, and install micro programs run by the channel control units 110 and disk control units 140. These settings may be made and the installation may be performed by the management terminal or performed via a network based on a program run by the information processors.

Figure 2:
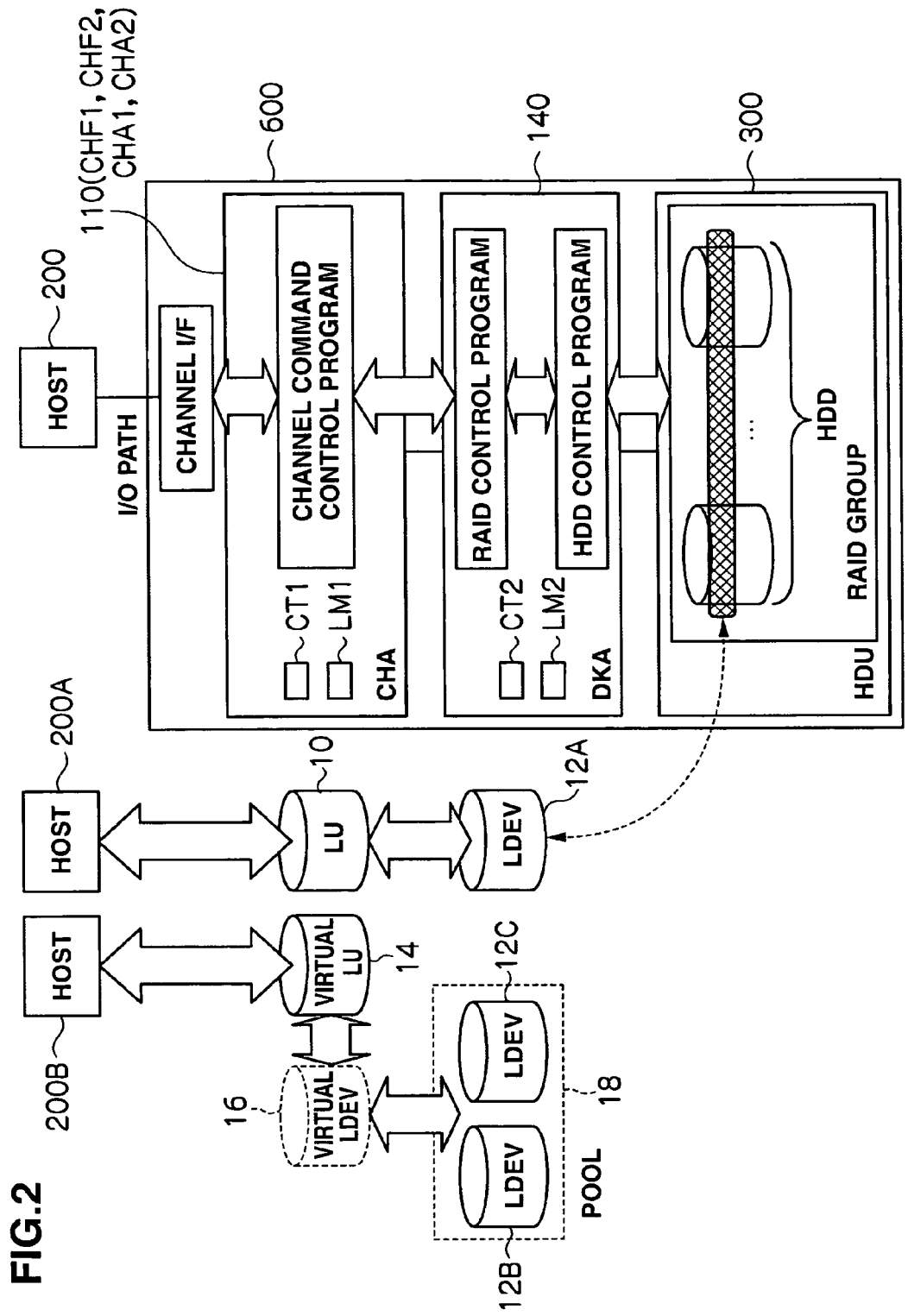
FIG. 2 is a block diagram showing a function of the storage control system shown in FIG. 1.

FIG. 2 is a block diagram showing a function of the storage control system shown in FIG. 1. It shows the processing based on the foregoing AOU. The processing is hereinafter called AOU processing. Each channel control unit 110 has a microprocessor CT1 and local memory LM1 storing a channel command control program. The microprocessor CT1 refers to the local memory LM1 to run the channel command control program.

The channel command control program provides LUs (logical units) to host systems (hosts). It processes access commands sent from the hosts to the LUs and converts the access commands to access to LDEVs (logical devices). The channel command control program accesses the LDEVs sometimes irrespective of the access by the hosts. An LDEV is a logical volume—a part of a RAID group. Virtual LDEVs are accessed by the hosts but do not have actual storage areas. The hosts do not access LDEVs but access LUs. LUs are units of storage areas accessed by the hosts. Some LUs are allocated to virtual LDEVs. The LUs assigned to the virtual LDEVs are called 'virtual LUs' in order to distinguish them from the LUs assigned to actual volumes.

Each disk control unit 140 has a micro processor CT2 and local memory LM2. The local memory LM2 stores a RAID control program and HDD control program. The micro processor CT2 refers to the local memory LM2 to run the RAID control program and HDD control program. The RAID control program forms a RAID group with a plurality of HDDs and provides LDEVs to the upper-level channel command control program. The HDD control program writes/reads data in/from the HDDs when requested by the upper-level RAID control program. A host 200A accesses an LDEV 12A via an LU10.

The storage areas are provided to a host 200B using the AOU technique. The Host 200B accesses a virtual LDEV 16 via a virtual LU14. The virtual LDEV 16 has a pool 18 allocated thereto and LDEVs 12B and 12C are allocated to that pool 18. The virtual LU and virtual LDEVs are equivalent to a virtual volume. A pool is a set of LDEVs allocated to a virtual LDEV. Incidentally, a channel I/F and I/O path are interfaces through which the hosts access a storage sub system, and are Fibre Channel interfaces or iSCSI interfaces. According to the RAID control program and HDD control program, the disk control units 140 allocate the storage areas in the pool 18 to a virtual LDEV based on data write access from the host 200B. The HDD control program performs power supply control for the LDEV-providing HDDs allocated to the pool 18.

Figure 3:
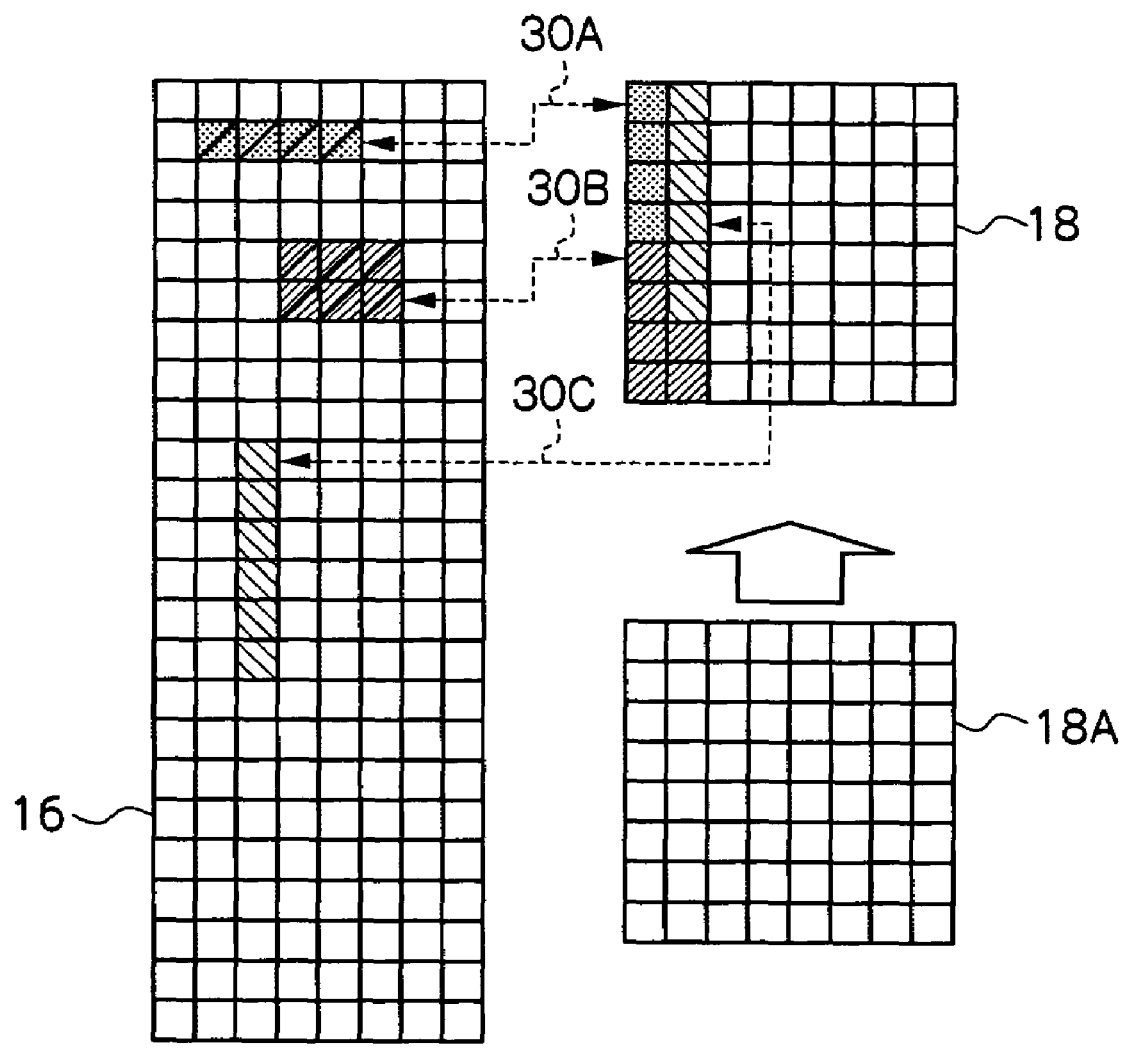
FIG. 3 is a block diagram showing the relationship between a virtual volume and a pool.

FIG. 3 is a block diagram showing the relationship between the virtual volume 16 and the pool 18. A host accesses the virtual volume 16. The area in the virtual volume 16 accessed by the host corresponds to a storage area in the pool 18. The allocation of a storage area in the pool 18 to the virtual volume is dynamically performed by the channel control units 110 in response to the access by the hosts. The unused areas among the areas in the virtual volume 16 do not require physical storage device, therefore, system management where the storage system 600 prepares a virtual volume with a large capacity for the hosts in advance, monitors the allocation situation of the storage areas in the pool 18 to the virtual volumes, and adds a new storage area 18A to the pool 18 as appropriate, is possible.

Figure 4:
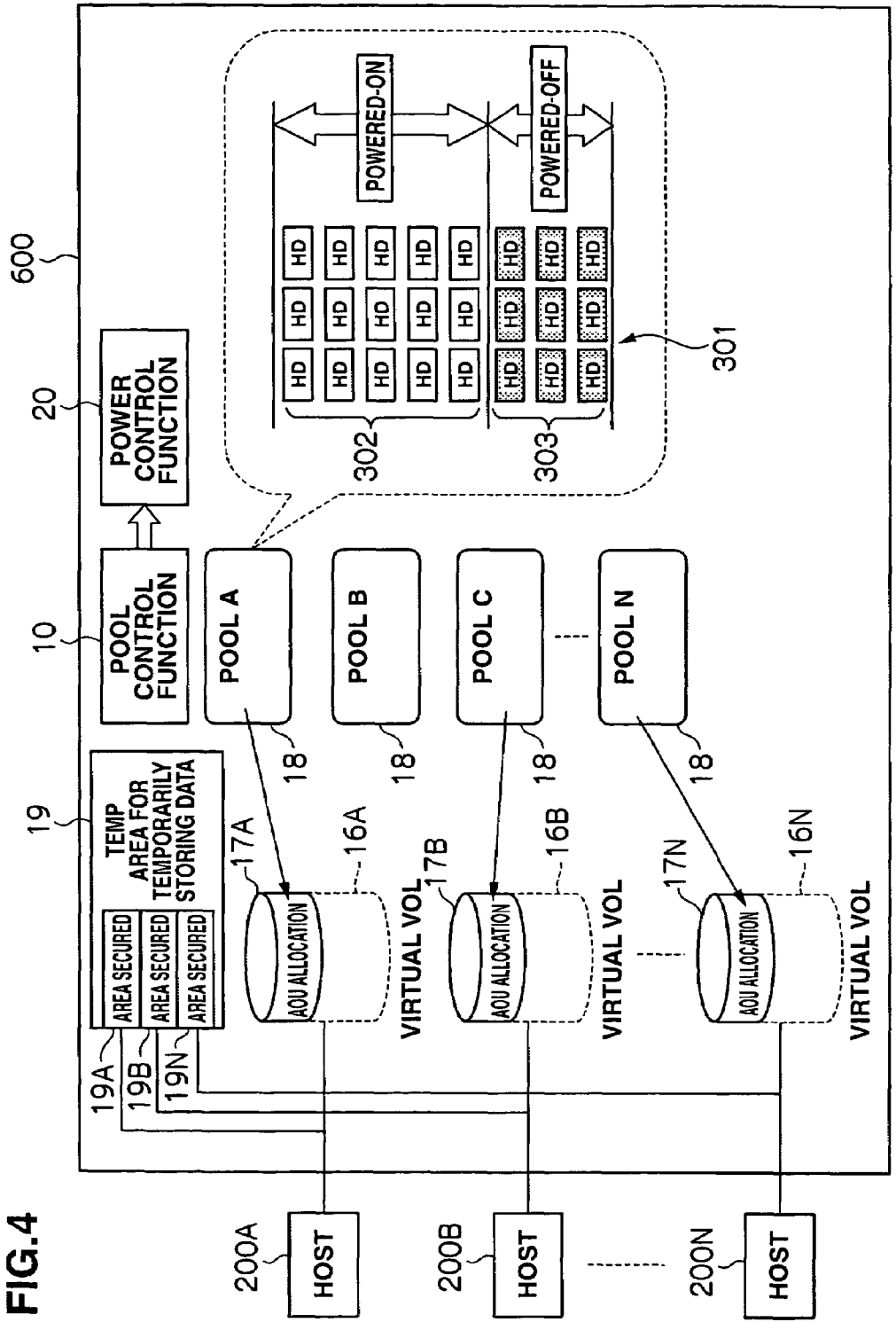
FIG. 4 is a block diagram showing the function for controlling the power supply for the data storage devices.

FIG. 4 is a block diagram showing the characteristic function of this invention. In the storage system 600, there are virtual volumes 17A, 17B ... and 17N associated with the hosts 200A, 200B ... and 200N, respectively. The virtual volumes 17A, 17B ... and 17N are associated with pools A, B ... and N, respectively. In the virtual capacity of the virtual volume 16A for the host 200A, the portion where the storage areas in the pool A are actually allocated is shown with the reference code 17A. Likewise, in the virtual capacity of the other volumes, the portions where the storage areas in the other pools are actually allocated are shown with corresponding reference codes.

The reference numeral 301 indicates a set of HDDs allocated to the pool A. A group of HDDs indicated by the reference numeral 302 is already allocated to the virtual volume 16A and provides an actual storage area 17A in the virtual volume 16A. A group of HDDs indicated by the reference numeral 303 is not allocated to the virtual volume 16A. The power switches of the HDDs in the group 302 are turned on and those of the HDDs in the group 303 are turned off.

The reference numeral 10 indicates a pool control function and the reference numeral 20 indicates a power supply control function. These functions are enabled by the HDD control program (FIG. 2). The pool control function is for controlling the allocation of the HDDs in the respective pools to the AOU volumes 16A, 16B to 16N and deciding on the percentage of the powered-on HDDs or powered-off HDDs.

The power supply control function is for controlling the power supply for the respective HDDs. Because the HDDs that are not allocated to any virtual volume are powered off, the power consumption of the storage system can be conserved. The HDD control program turns on HDD(s) when they are allocated to a virtual volume. The reference numeral 19 indicates a temporary storage area (Temp area) for temporarily storing data when a host requests storage of that data, when the data size is larger than the size of the storage areas of a virtual volume. In the Temp area, storage areas (19A, 19B ... and 19N) are secured for each of the virtual volumes. Incidentally, instead of turning off the HDDs, the HDDs may be put in power-saving mode. In the latter case, the HDD mode is switched from power-saving mode to normal mode when they are allocated to the virtual volumes. In the explanation below, an example where the HDDs are turned off is described but this invention is not limited to that case.

The storage system 600 has tables necessary for controlling the power supply for the HDDs belonging to the pools. FIG. 5 is a disk management table storing, for each HDD belonging to the same pool, the type, performance (capacity and rotation number), memory capacity, name of the storage apparatus where it is mounted, access frequency, allocation or non-allocation to a virtual volume (AOU allocation), and power status information.

Initial settings for the disk management table are made by a management apparatus. An example of the management apparatus is the management terminal 160 provided in the storage system 600. Another example of the management apparatus is a management server connected to the storage system 600 via the LAN. A channel control unit 110 judges whether AOU allocation is necessary for a HDD or not and whether the HDD should be powered on or off in accordance with the access from a host and updates/registers the judgment result in the disk control table. Based on the disk control table, the relevant disk control unit 140 performs AOU allocation and controls the power supply for the HDD. Incidentally, update/registration may be performed by the management apparatus. The disk management table is stored in the shared memory. The relevant disk control unit 140 registers the remaining capacity of the HDD in the disk management table.

Figures 6, 7:
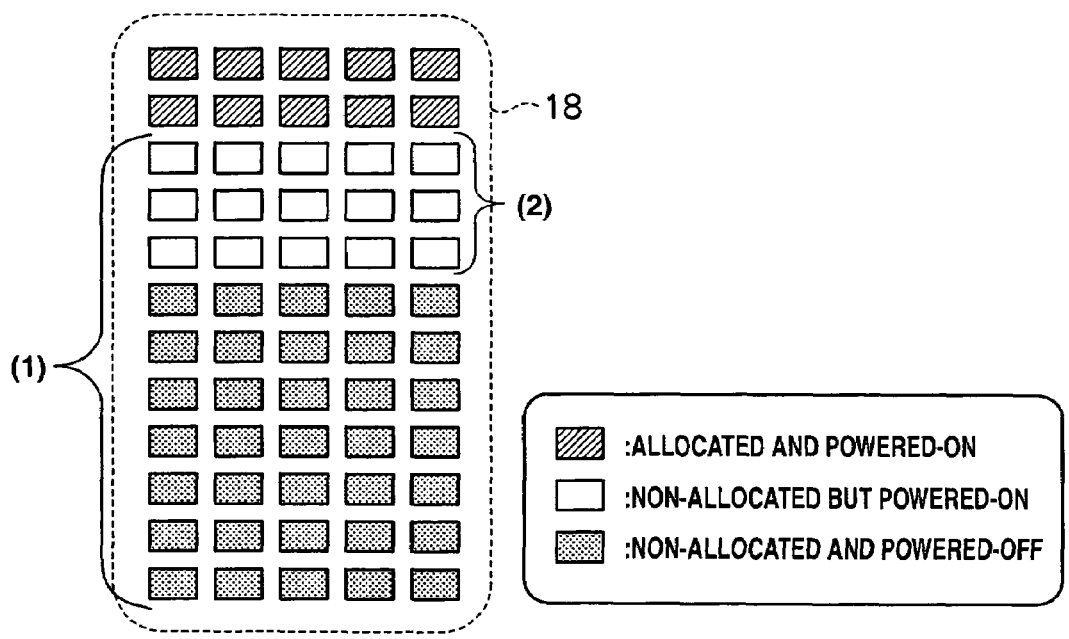
FIG. 6 is a pool management table used for controlling the power supply for the HDDs belonging to pools.
FIG. 7 is an explanatory diagram of control information contained in the pool management table.

FIG. 6 is a pool management table for controlling the power supply for the HDDs belonging to the pools. This pool management table manages the total storage capacity of each pool. The total storage capacity is the sum of the storage capacities of the data storage devices allocated to a pool. It increases when a new data storage device is added to the pool. The pool management table stores information for each pool regarding: the total storage capacity of non-AOU-allocated HDDs; the total storage capacity of the non-AOU-allocated but powered-on HDDs; the proportion of powered-on HDDs to powered-off HDDs; the proportion of to-be-powered-on non-AOU-allocated HDDs in the non-AOU-allocated HDDs; and the proportion of HDDs that should be powered on when powering on HDDs to powered-off HDDs. Proportions are not based on the number of HDDs, but on the storage capacity of the HDDs. This pool management table is stored in the shared memory. The disk control units 140 refer to this table to control the power supply for the data storage devices.

Figure 8:
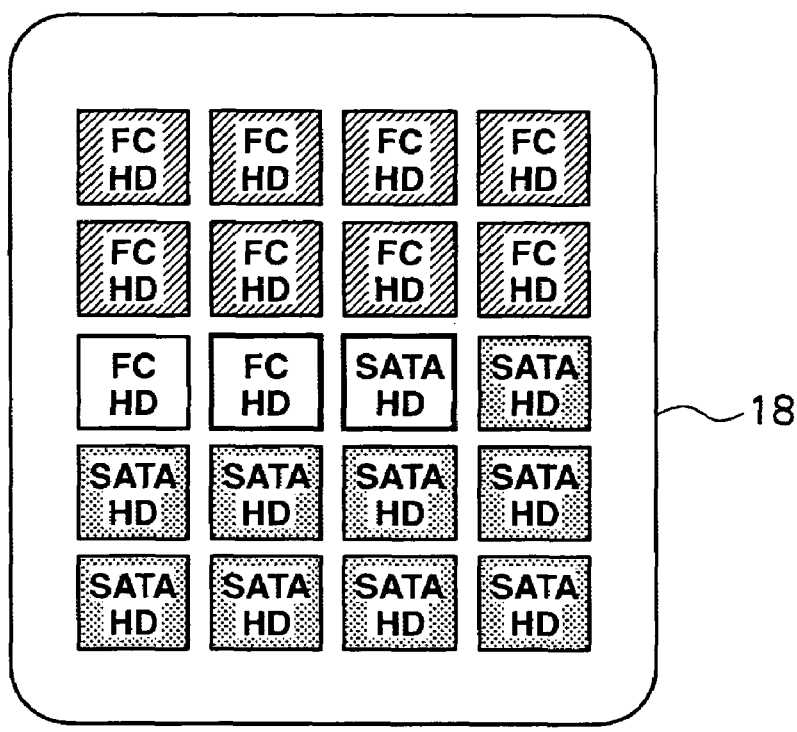
FIG. 8 is a block diagram of a pool, showing the types and power on/off states of the data storage devices belonging to a pool.

FIG. 7 is an explanatory diagram showing control information contained in the pool management table. (1) shows the non-AOU-allocated HDDs and (2) shows non-AOU-allocated but powered on HDDs). The percentage of currently powered-on HDDs is calculated by the formula [(2)/(1)]×100 (%). The percentage of HDDs that should be powered on is a reference used, when the percentage of the non-AOU-allocated powered-on HDDs is below a threshold value, for controlling the power supply for the HDDs—switching from off to on. In FIG. 7, one rectangular block is equivalent to one HDD. As shown in FIG. 8, for the HDDs, those using Fibre Channel and SATA as communication protocols can be used. AOU allocation is performed for the HDDs starting with HDDs with higher performance (FC drives). In other words, high-performance HDDs are given priority when it comes to being powered on.

The reason why the non-AOU-allocated HDDs are powered on even before allocation is because the speed of access from the hosts to the AOU volumes (virtual volumes) can be increased by doing so. As shown in FIG. 9, the power on/off of the data storage devices may be controlled for each case. A case is a structure housing data storage devices. Cases 1 to 3 each have a plurality of data storage devices and the power supply control for the data storage devices is performed for each case. Allocation to a virtual volume is performed for each data storage device. Each case houses data storage devices of different performance. The data storage devices are powered on starting with those with higher performance, i.e., the data storage devices having high access performance, in other words, they are allocated to virtual volumes in a preferential manner. Priority may also be given to data storage devices based on their usage, for example, the data storage devices with a lower frequency of use in the past may have priority in being powered on.

Figure 10:
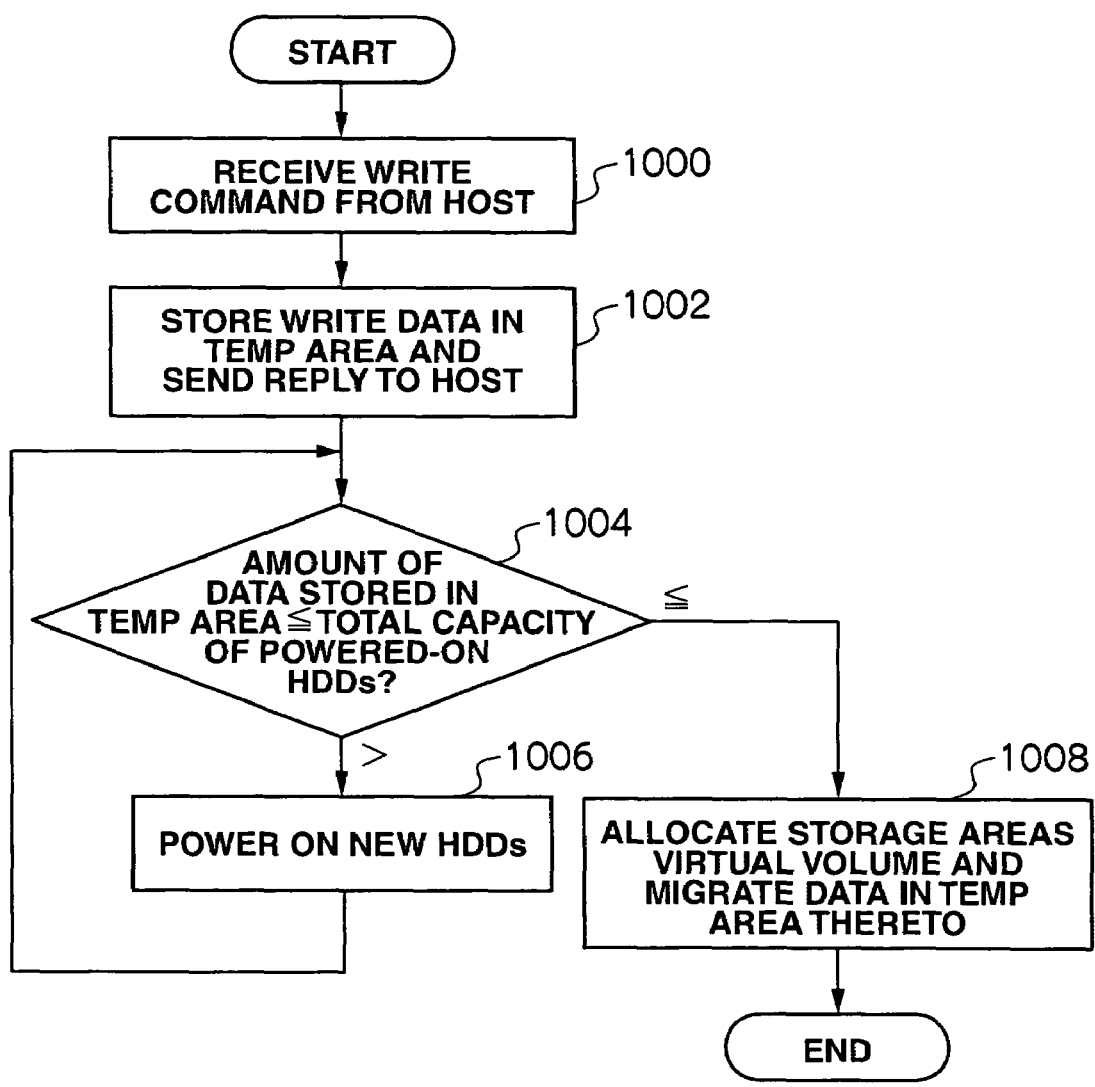
FIG. 10 is a flowchart showing the power supply control operation for the data storage devices.

Next, an example of power supply control for HDDs is explained below. FIG. 10 is a flowchart showing a first example. When a channel control unit 110 receives a write command from a host (S1000), it analyzes the write command, temporarily stores write data in the Temp area, and sends write success notification to the host (S1002). Then, the channel control unit 110 performs AOU processing. The AOU processing is processing where, when the storage system receives a write access from a host system, a channel control unit 110 judges whether an actual storage area has been allocated to the virtual volume specified by the host system, and if the judgment is negative, it performs allocation.

For this judgment, the channel control unit 110 compares the amount of data stored in the Temp area with the total capacity of non-allocated storage areas in the powered-on HDDs (S1004). The channel control unit 110 can obtain the total capacity by referring to the disk management table (FIG. 5). If the amount of data stored in the Temp area exceeds the total capacity of the non-allocated storage areas, the channel control unit 110 updates the content of the disk management table in order to power on powered-off HDDs.

The relevant disk control unit 140 refers to the disk management table and decides which HDDs to power on, according to the order of priority, i.e., starting with the HDDs listed at the top of the disk management table 5 shown in FIG. 5, and powers on the HDDs (S1006). Accordingly, the newly powered-on HDDs provide a storage area to the host system. The channel control unit 110 again performs the foregoing judgment step (S1004) while referring to the disk management table.

In the foregoing judging step, if the amount of data stored in the Temp area is less than the total capacity of the non-allocated storage areas, the channel control unit 110 allocates the non-allocated areas of the powered-on data storage devices to the relevant virtual volume, stores the data stored in the Temp area in the areas in the virtual volume, and deletes the data from the Temp area (S1008).

Figure 11:
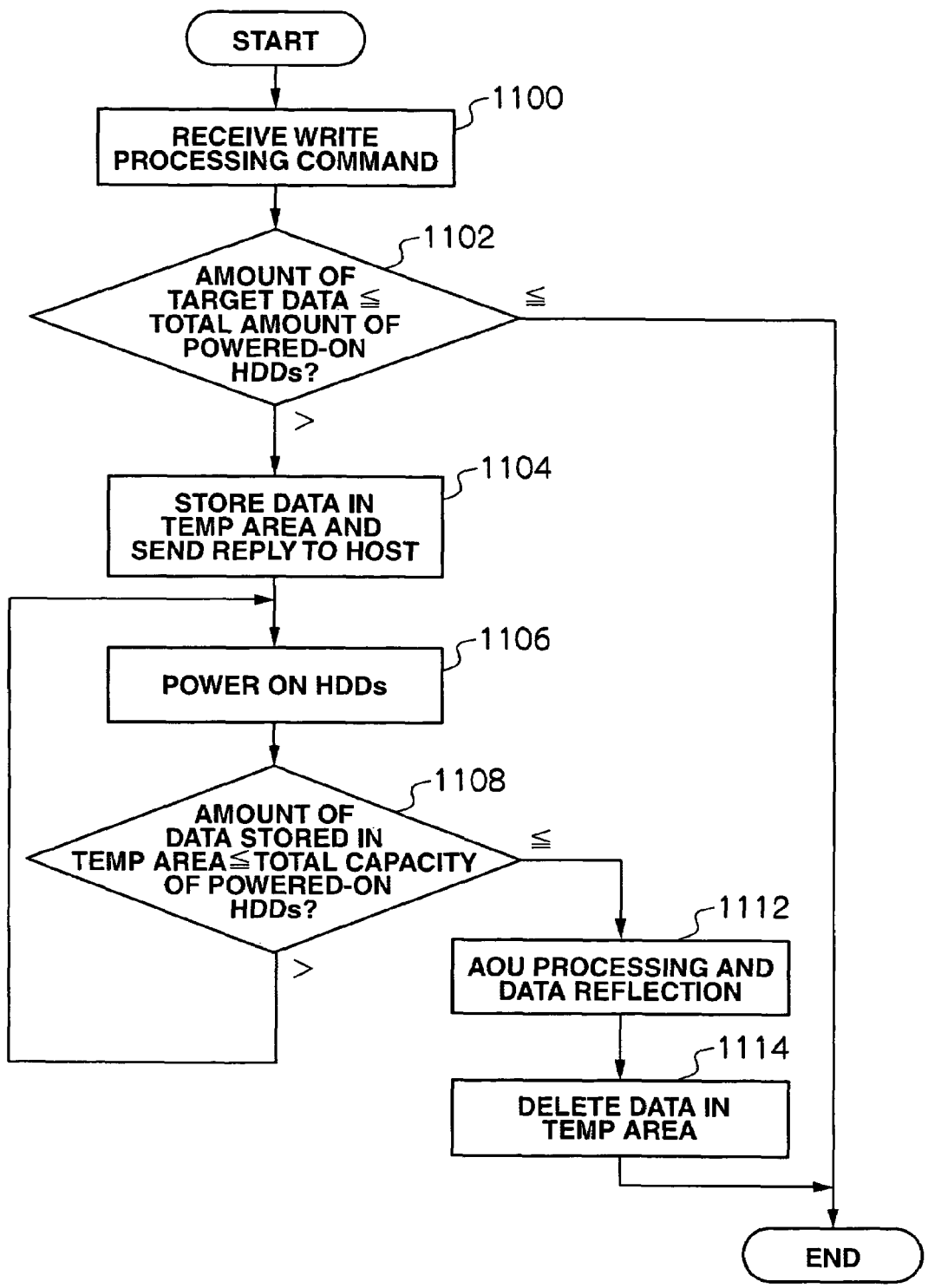
FIG. 11 is a flowchart showing a second example of the power supply control for the data storage devices.

FIG. 11 shows a second example of the power supply control processing. What is different from the first example is that if the amount of data requested by the host system to be stored in the storage system exceeds the total capacity of the non-allocated storage areas of powered-on data storage devices, the data is stored in the Temp area. First, a channel control unit receives a write processing command from a host (S100). If it is judged in step S1102 that the amount of write-requested data exceeds the total capacity of non-allocated storage areas in the powered-on HDDs, the channel control unit 110 temporarily stores the data in the Temp area (S1104). Then, HDD(s) are powered on (S1106).

The relevant disk control unit 140 then compares the amount of data stored in the Temp area and the total capacity of non-AOU-allocated storage areas in the powered-on HDDs (S1108) and repeats the same step S1108 for as long as the former exceeds the latter. Then, if it is judged that the former is below the latter in S1108, the disk control unit 140 allocates newly powered-on HDD(s) to the relevant virtual volume and migrates the data stored in the Temp area to the powered-on HDD(s) (S1112). Then, the disk control unit 140 deletes the data in the Temp area (S1114).

Figure 12:
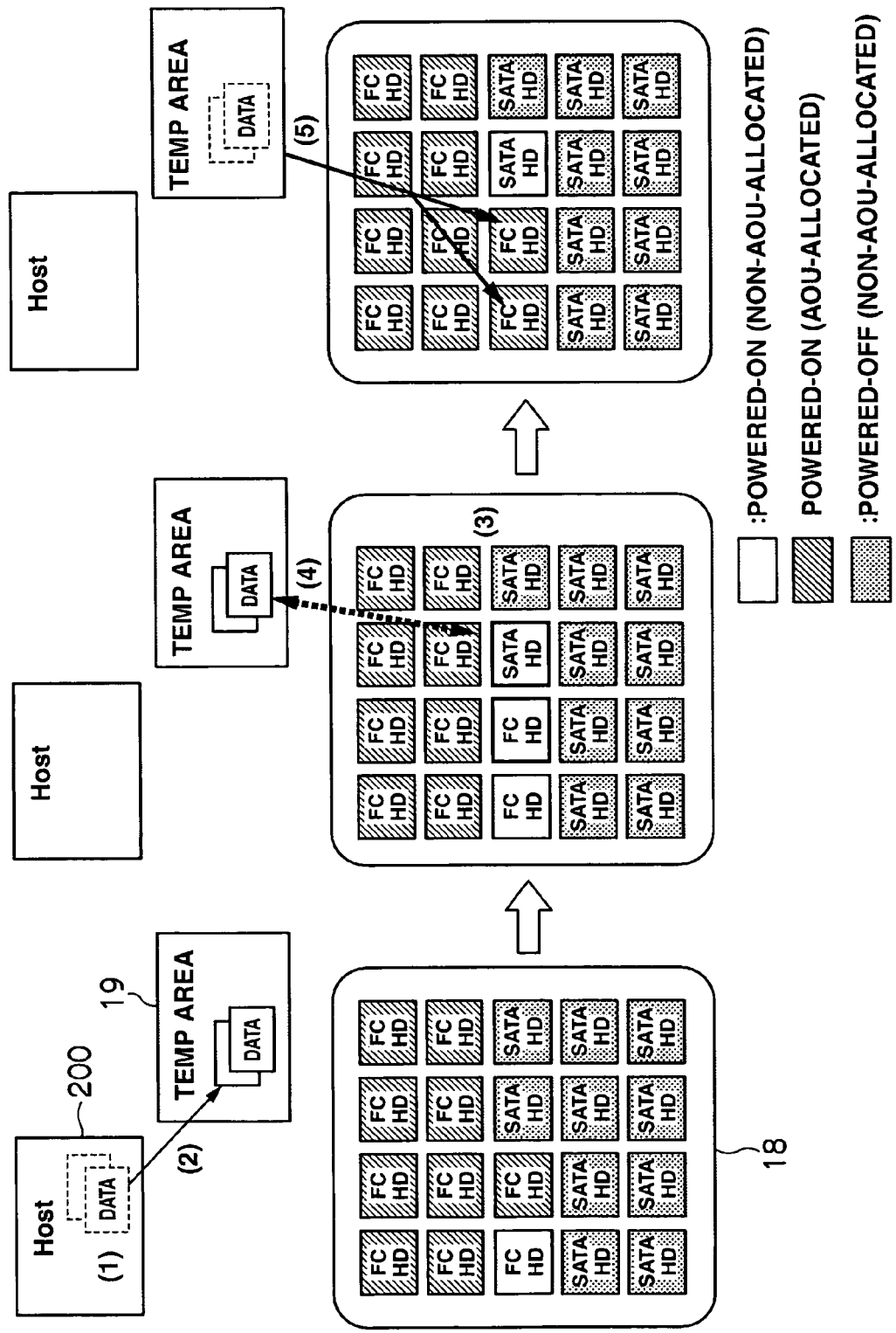
FIG. 12 is a block diagram of a pool, showing the power supply control operation procedure for the data storage devices.

FIG. 12 is a block diagram showing the power-on operation procedure for the HDDs. When a host system makes a request to write data of a size larger than the combined storage area of the powered-on HDDs as shown in (1), the relevant channel control unit 110 stores the write data in the Temp area as shown in (2) and notifies the host system of completion of data writing. Then, as shown in (3), the HDDs that provide a certain percentage, for example, 10% of the total combined storage area. In order to reach this percentage, the relevant disk control unit 140 turns on the HDDs on a unit-by-unit basis. Then, as shown in (4), the channel control unit 110 compares the total capacity of the non-allocated storage areas of the powered-on HDDs with the amount of data stored in the Temp area and if the former is not enough, the disk control unit 140 turns on more HDDs, which provide another 10% of the storage capacity. In (5), the storage areas of the powered-on HDDs are allocated to the relevant virtual volume and the data in the Temp area is migrated to the storage areas in the virtual volume.

Figure 13:
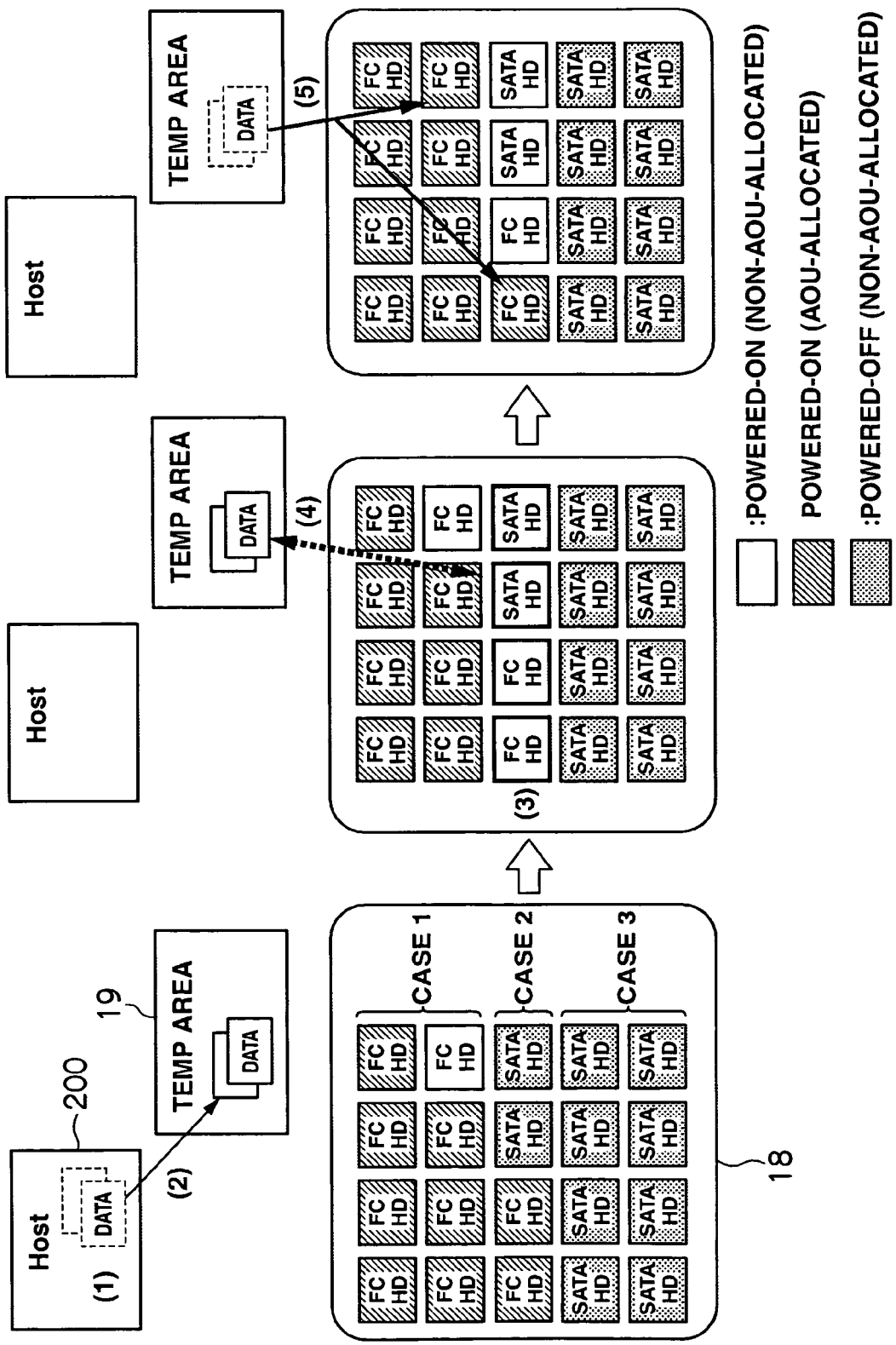
FIG. 13 is a block diagram of the pool, showing a second example of the power supply control operation procedure for the data storage devices.
Figure 14:
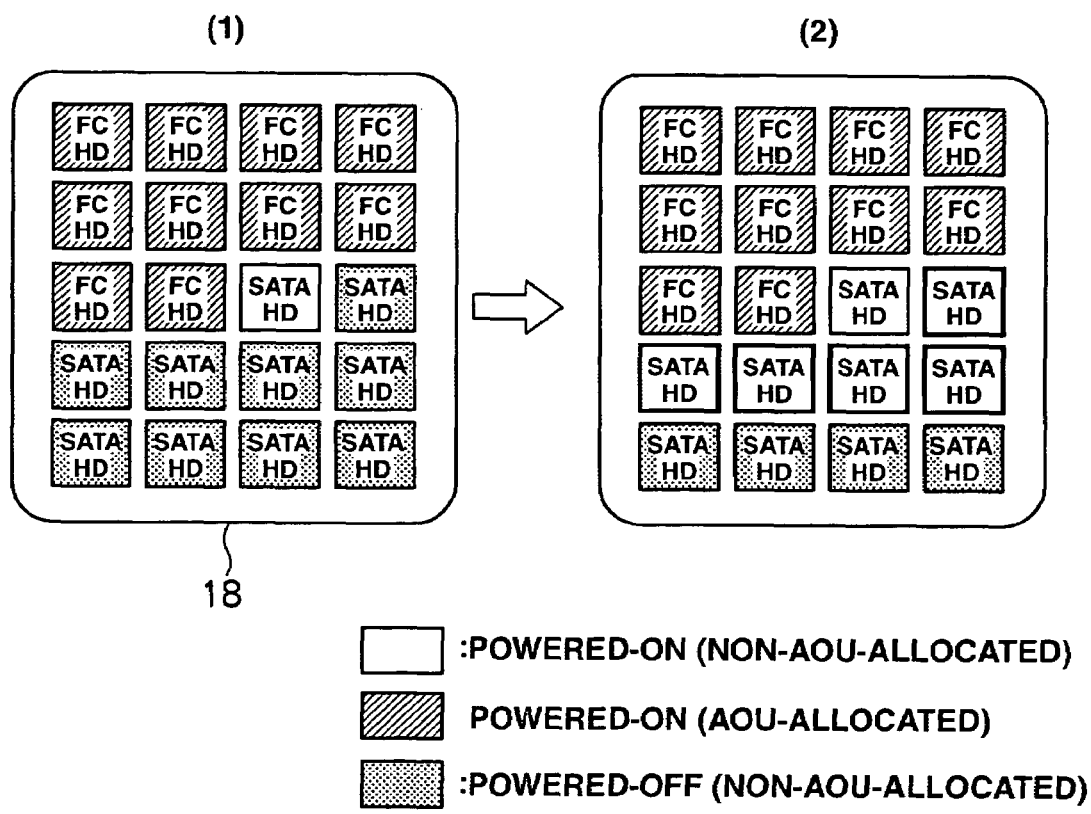
FIG. 14 is a block diagram of the pool, showing a third example of the power supply control operation procedure for the data storage devices.

FIG. 13 is a block diagram showing a second example of the power-on operation procedure for the HDDs. The second example is different from the first one in that the HDDs are powered on by cases as shown in (3). The percentage of HDDs that are powered-on before allocation to virtual volumes is selected as appropriate and is not limited. FIG. 14 is a block diagram showing a third example of the power-on operation procedure for the HDDs. In this example, after the processing shown in FIGS. 10 and 11, the disk control unit 140 refers to the pool management table to check the percentage (threshold value) of HDDs that should be powered on and that of the HDDs that are already powered-on and, if the percentage of the powered-on HDDs has not reached the threshold value, it turns on HDD(s) (FIG. 12 (1) to (2)). Accordingly, after the processing shown in FIGS. 10 and 11, the disk control unit 140 calculates, based on the pool management table, the capacity or percentage of non-AOU-allocated storage areas in the powered-on HDDs and compares it with the threshold value defined in the table and, if it is the same as or below the threshold value, the disk control unit 140 calculates the storage capacity necessary to reach the threshold value and turns on HDDs corresponding to the storage capacity.

FIG. 15 is a block diagram showing another example of the power supply control for the data storage devices. Because the actual storage capacity of the AOU volume 16 is not fixed but changeable, the data in the AOU volume 16 is copied to a disk 16', which is a volume for normalizing the data in the AOU volume 16. As a result, the storage areas allocated to the AOU volume can be released from being allocated. FIG. 15 shows the situation where the data in the storage areas (HDDs) belonging to the pool 18 allocated to the virtual volume 16 is migrated to the normalization volume 16'.

After migration of the data to the normalization volume 16', the migration source—allocation-released HDDs—are powered off. The storage areas of these HDDs are again allocated to another AOU volume. FIG. 16 shows a disk management table for normalization processing. The disk attribute section shows whether a HDD is allocated to a virtual volume or normalization volume (i.e., a fixed volume). The AOU allocation flag for a HDD allocated to a normalization volume is OFF. The HDDs once allocated to virtual volumes and powered on are released from being AOU-allocated and powered off after normalization processing. HDDs powered off as described above may be released from being allocated to the pools. Incidentally, the total storage capacity of the pools may increase by allocation of a new HDD thereto. In the foregoing embodiment, the Temp area is provided by the cache memory.

What is claimed is:

1. A storage system having a plurality of data storage devices and a controller configured to control a data read/write operation to/from the data storage devices in response to a request from a host connected to the controller via a communication path, the storage system comprising:

a virtual volume the host accesses; and a pool comprised of the data storage devices and allocated to the virtual volume when the controller controls the data write operation in response to the request from the host to the virtual volume, and when the controller controls the data write operation in response to the request from the host to the virtual volume, wherein, the controller is configured to put one or more of the data storage devices in the pool that are not allocated to the virtual volume in a standby mode, and to put the data storage devices in the pool that are allocated to the virtual volume in an operational model, a control table including allocation information of the data storage devices to the virtual volume, power supply information for the data storage devices, and information about a threshold percentage of data storage devices that are to be powered ON before being allocated to the virtual volume, wherein the controller is configured to calculate a current percentage of data storage devices that are powered ON before being allocated to the virtual volume, wherein the controller is configured to compare the information about the threshold percentage of data storage devices that are to be powered ON before being allocated to the virtual volume in the control table to the current percentage of data storage devices that are powered ON before being allocated to the virtual volume, and wherein, when the current percentage is less than the information about the threshold percentage of data storage devices in the control table, the controller is configured to power ON one or more storage devices before receiving a write request.

2. The storage system according to claim 1, wherein the controller is configured to power ON the data storage devices allocated to the virtual volume and powers OFF in the data storage devices in a standby mode.

3. The storage system according to claim 2, wherein the controller is configured to power ON one or more of the data storage devices before their allocation to the virtual volume.

4. The storage system according to claim 2, wherein the controller is configured to compare the total amount of data requested by the host system to be written in the data storage devices and the storage capacity of the data storage devices that are powered ON but not allocated to the virtual volume and, if the former exceeds the latter, to power ON other data storage device(s) belonging to the pool and to allocate them to the virtual volume.

5. The storage system according to claim 2, wherein the data storage devices including at least two different types of the data storage device each of which is applied different communication protocol are allocated to the pool and the controller is configured to power ON the data storage devices, starting with those with higher performance.

6. The storage system according to claim 2, wherein the plurality of data storage devices having different frequency of use are allocated to the pool and the controller is configured to power ON the data storage devices, starting with those with a lower frequency of use.

7. The storage system according to claim 2, wherein the controller is configured to store write data sent from the host system in a cache memory and to store the write data in the powered-ON data storage devices.

8. The storage system according to claim 2, wherein the controller is configured to migrate the write data sent from the host system and stored in the data storage devices allocated to the virtual volume to a normalization volume and then to release the data storage devices from being allocated to the virtual volume and to power OFF the data storage devices.

9. A method for controlling a storage system having a plurality of data storage devices and a controller configured to control data read/write operation to/from the data storage devices in response to a request from a host system connected to the controller via a communication path, the storage system further including a virtual volume the host system accesses; and a pool comprised of the data storage devices allocated to the virtual volume, and allocated to the virtual volume when the controller controls the data write operation in response to the request from the host system to the virtual volume, the method comprising:

the controller putting one or more of the data storage devices in the pool that are not allocated to the virtual volume in a standby mode; and the controller putting the data storage devices in the pool allocated to the virtual volume in an operational mode, a control table including allocation information of the data storage devices to the virtual volume, power supply information for the data storage devices, and information about a threshold percentage of data storage devices that are to be powered ON before being allocated to the virtual volume, said method further comprising:

the controller calculating a current percentage of data storage devices that are powered ON before being allocated to the virtual volume, the controller comparing the information about the threshold percentage of data storage devices that are to be powered ON before being allocated to the virtual volume in the control table to the current percentage of data storage devices that are powered ON before being allocated to the virtual volume, and when the current percentage is less than the information about the threshold percentage of data storage devices in the control table, the controller operating to power ON one or more storage devices before receiving a write request.

10. The storage system according to claim 1 further comprising an interface communicatively connected to an other storage system via the communication path, wherein the other storage system comprises data storage device that are comprised of the pool by communication between the controller and the other storage system through the interface.

* * * * *